C. W. BLAKESLEE.

Assignor of one-half his interest to Levi S. Wooster.

SNAP-HOOKS.

No. 7,893. Reissued Sept. 25, 1877

Witnesses:
Robt. F. Gaylord
Lewis S. Berry

Inventor:
C W Blakeslee
By W. E. Simonds.
Atty.

N. PETERS, PHOTO-LITHOGRAPHER, WASHINGTON, D.C.

UNITED STATES PATENT OFFICE.

CHARLES W. BLAKESLEE, OF LITCHFIELD, CONNECTICUT, ASSIGNOR OF ONE-HALF INTEREST TO LEVI S. WOOSTER.

IMPROVEMENT IN SNAP-HOOKS.

Specification forming part of Letters Patent No. 175,912, dated April 11, 1876; Reissue No. 7,893, dated September 25, 1877; application filed September 6, 1877.

*To all whom it may concern:*

Be it known that I, CHARLES W. BLAKESLEE, of Litchfield, in the county of Litchfield and State of Connecticut, have invented certain new and useful Improvements pertaining to Snap-Hooks; of which the following is a specification, reference being had to the accompanying drawings, where—

Figure 2:
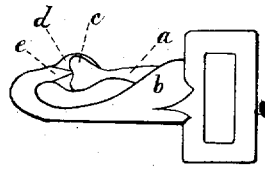
Figure 1:
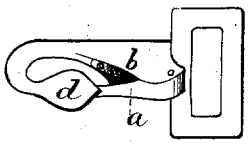
Figure 3:
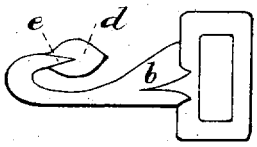
Figure 4:
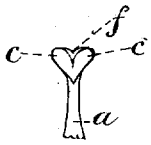

Figure 1 is a perspective view of the hook. Fig. 2 is a view of the hook, showing the inner side of the tongue and body at the point where they meet. Fig. 3 is a view of the hook-body only, the tongue removed, in the same position as in Fig. 2. Fig. 4 is a detail view of the face of the end of the tongue.

My invention relates to snap or rein hooks; and its object is to obtain greater security against their accidental unhooking.

The invention consists in making an enlargement on the meeting ends of both the body and the tongue of the hook, in a manner more fully hereinafter set forth.

The tongue *a* is pivoted to and in the body *b*, in the usual manner. The forward or free end of the tongue is provided with lateral projections *c c*, and that end of the hook-body which meets the front end of the tongue is provided with a shield, *d*, which covers the projections *c c*.

When a ring or the like is snapped into a common snap-hook a twisting movement can be given to the ring which will cause it to press inwardly on the outside of the tongue, and thus open the hook. Such a thing not infrequently happens by accident. In attempting to open my improved hook in the same way the ring brings up against the inside of one of the projections *c*, and this twisting movement cannot be developed far enough to press the tongue inward.

The shield *d* is requisite to prevent the ring from access to and pressure upon the outer or face side of projections *c*.

A rib, *e*, made upon the hook-body and shutting into a corresponding slot, *f*, when the snap is closed, aids in preventing lateral motion of the free end of the tongue when it is closed.

Nothing is claimed herein upon the manner of pivoting the tongue to the hook-body, or upon the spring which presses the tongue outward to the position of closed. The slot *f* is contained in the tongue.

I claim as my invention—

1. The tongue *a*, provided with the projections *c*, in combination with the hook-body *b*, provided with the shield *d*, all substantially as described.

2. A snap-hook consisting of the body *b*, having the shield *d* and rib *e* on its end, in combination with the tongue *a*, having the projections *c c* and slot *f*, substantially as shown and described.

CHARLES W. BLAKESLEE.

Witnesses:
W. E. SIMONDS,
JOHN WARD.